June 14, 1960 A. W. LO 2,941,090

SIGNAL-RESPONSIVE CIRCUITS

Filed Jan. 31, 1957

3 Sheets-Sheet 1

INVENTOR.
ARTHUR W. LO

BY Morris A. Pabkin

ATTORNEY

INVENTOR.
ARTHUR W. LO
BY
Morris A. Lakin
ATTORNEY

INVENTOR.
ARTHUR W. LO
BY
Morris Lahtin
ATTORNEY 2,941,090

SIGNAL-RESPONSIVE CIRCUITS

Arthur W. Lo, Fords, N.J., assignor to Radio Corporation of America, a corporation of Delaware Filed Jan. 31, 1957, Ser. No. 637,452
15 Claims. (Cl. 307—88)

This invention relates to signal-responsive circuits which produce one of two different outputs corresponding to one of two different inputs.

Certain of the prior-art circuits of the type referred to above obtain the desired result by an arrangement of one or more bistable circuits with one or more gating circuits. Each of the bistable circuits and each of the gating circuits may use a plurality of electronic devices, such as vacuum tubes, and associated circuit elements for operating the electronic devices. During operation, holding power is required to maintain the bistable and the gating circuits in a desired response condition.

It is an object of the present invention to provide improved signal-responsive circuits of the type referred to above.

Another object of the present invention is to provide improved signal-responsive circuits, of the type referred to above, which do not require holding power.

Still another object of the present invention is to provide improved signal-responsive circuits which are simpler to construct and which are more reliable in operation.

According to the present invention, in a signal-responsive circuit, one of two input signals triggers a bistable circuit to a corresponding one of two response conditions. The triggering of the bistable circuit establishes a magnetic core memory circuit in one of two response conditions. At some later desired time, an output is produced on one of two output paths under the control of the memory circuit. No holding power is required for either the bistable circuit or the memory circuit.

According to one aspect of the present invention, the circuit responds to an input signal according to polarity; that is, whether the signal is of the one or the other polarity. According to another aspect of the invention, the circuit responds to the input signal according to amplitude; that is, whether the signal is of a relatively large or a relatively small amplitude. In the latter case, the circuit is insensitive to signal polarity.

In the accompanying drawing, in which like reference numerals designate like parts:

Figure 1:
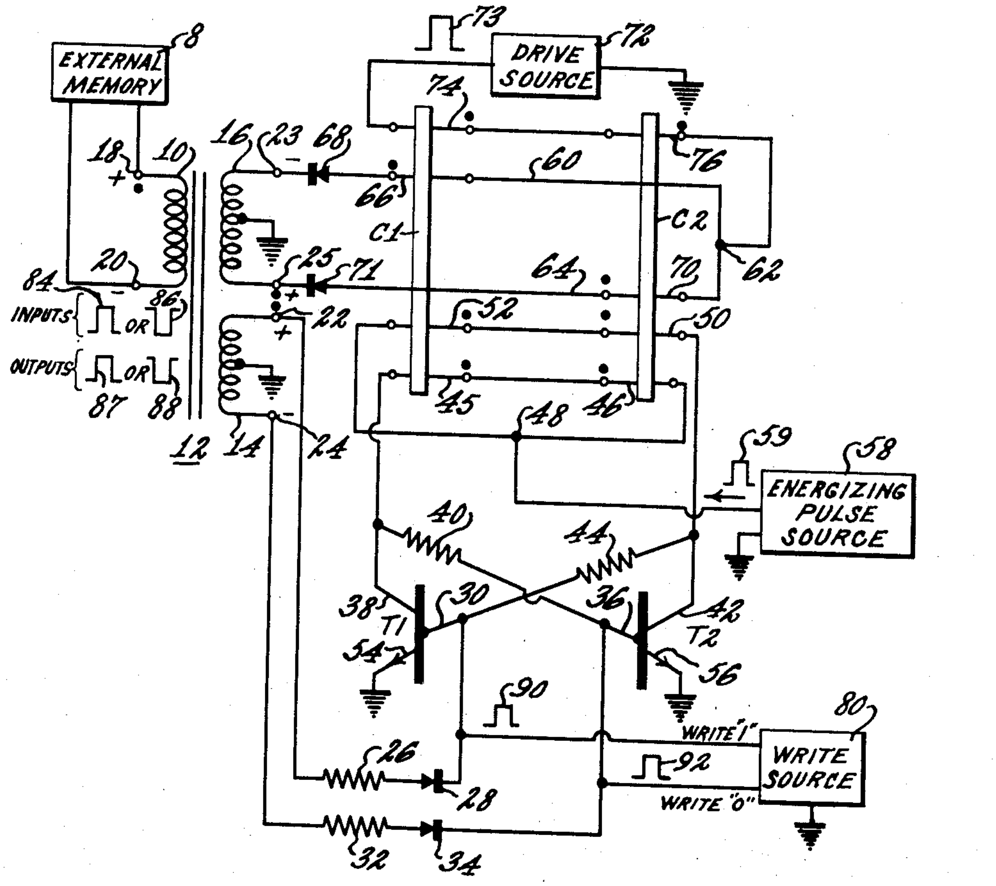
Fig. 1 is a schematic diagram of one embodiment of the invention which provides an output in accordance with the polarity of an input signal and which uses a pair of magnetic cores in a memory circuit.

In Fig. 1, the input signals from a signal device 8 are applied to the primary winding 10 of a pulse transformer 12 which has two center-tapped secondary windings 14 and 16. The signal device 8, for example, may be a magnetic core memory array. An input signal applied to the primary winding 10 may be of either the one or of the other polarity. Thus, the terminal 18 may be either positive or negative with respect to the primary terminal 20. The conventional transformer dot notation is used to represent the relative senses of linkage of the primary and the secondary windings to the transformer 12. When the marked terminal 18 of the primary winding 10 becomes more positive with respect to the unmarked terminal 20, the voltages induced in the secondary windings 14 and 16 are of a polarity positive at marked terminals 22 and 25 with respect to the unmarked terminals 24 and 23. The terminals 22 and 24 of the secondary winding 14 are each connected respectively through the current-limiting resistors 26 and 32, and the two unilateral conducting devices, respectively, such as the crystal diodes 28 and 34, to the respective base electrodes 30 and 36 of first and second transistors T1 and T2. The crystal diodes 28 and 34 are each poled to pass positive current (conventional flow) in the easy direction to the base electrodes 30 and 36 of the transistors T1 and T2. The collector electrodes 38 and 42 of the transistors T1 and T2 are respectively cross-coupled by first and second coupling resistors 40 and 44 to their respective base electrodes 36 and 30. A setting winding 45 linked to a first magnetic core C1, and a reset winding 46 linked to a second magnetic core C2, are serially connected between the collector electrode 38 of the first transistor T1 and a first junction 48. A setting winding 50 linked to the second core C2, and a reset winding 52 linked to the first core C1, are serially connected between the collector electrode 42 of the second transistor T2 and a first junction 48. The emitter electrodes 54 and 56 of the first and second transistors T1 and T2 are connected to a point of reference potential, indicated in the drawing by the conventional ground symbol. A source of energizing pulses 58 has one output connected to the first junction 48 and another output connected to ground. First and second current paths 60 and 64 are connected in parallel with each other between a second junction 62 and ground. The first current path includes, in series, a control winding 66 linked to the first core C1, a unilateral conducting device, such as a crystal diode 68, and the half of the secondary winding 16 between terminal 23 and a grounded center tap on this secondary. The second current path 64 includes, in series, a control winding 70 linked to the second core C2, a unilateral conducting device, such as a crystal diode 71, and the other half of the secondary winding 16. The crystal diodes 68 and 71 are each poled to pass current in the easy direction (conventional flow) from the second junction 62 between terminal 25 and the grounded center tap on this secondary. The senses of linkage of the respective windings to the cores C1 and C2 are more fully described hereinafter.

Each of the transistors T1 and T2 is of the NPN conductivity type. Accordingly, the energizing pulse source 58 may be of any suitable source arranged for supplying positive-going voltage pulses, with respect to ground, to the first junction 48. The quiescent output level of the source 58 at the junction 48 is at ground potential. The energizing source 58 may be, for example, a one-shot multivibrator.

If desired, transistors T1 and T2 of the PNP conductivity type may be employed. In such case, an energizing source 58 is used which provides negative-going voltage pulses with respect to ground at the junction 48, and the crystal diodes 28 and 34 are then poled in the opposite direction from that shown.

A series circuit between ground and the second junction 62 includes a drive source 72, a first drive winding 74 on the core C1 and a second drive winding 76 on the core C2. The drive source 72 is arranged for supplying positive-going pulses to the second junction 62. Preferably, the drive source 72 is a constant-current source, for example, a pentode-tube amplifier circuit.

Figure 2:
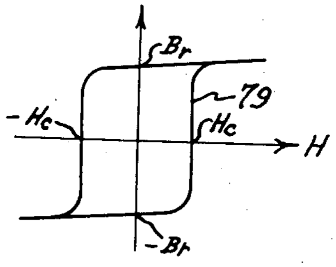
Fig. 2 is a graph of a hysteresis characteristic for either of the cores of Fig. 1.

Each of the cores C1 and C2 is made from substantially rectangular hysteresis loop magnetic material having two remanent states. The two remanent states of a core are indicated on the hysteresis characteristic 79 of Fig. 2 at the two corresponding points B*r* and —B*r*. A positive magnetizing force in excess of a coercive force H*c* changes a core from remanence at —B*r* to remanence at B*r*; and a negative magnetizing force in excess of a coercive force —H*c* changes a core from remanence at B*r* to remanence at —B*r*.

Figure 3:
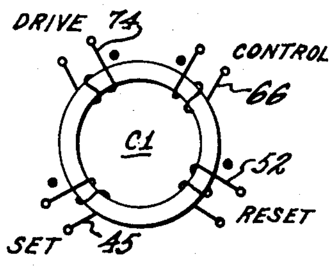
Fig. 3 is a schematic diagram illustrating in detail the senses of linkage of the windings of the core of Fig. 1.

The senses of linkage of the respective windings of a core, for example the core C1, are indicated in more detail in Fig. 3. A positive current flow (conventional) into a marked terminal of a winding generates a positive magnetizing force. The flux change produced in a core by the positive magnetizing force induces a voltage in each winding linked to the core in a direction to make the marked terminal positive relative to the unmarked terminal. Positive current flow into an unmarked terminal generates a negative magnetizing force. The flux change produced in a core by a negative magnetizing force induces a voltage in each winding linked to the core in a direction to make the unmarked terminal positive relative to the marked terminal.

In Fig. 1, the pair of transistors T1 and T2 form a symmetrical circuit. Initially, both the cores C1 and C2 are magnetized to the —B*r* remanent state. The windings 45 and 46 of the cores C1 and C2 provide a load circuit for the transistor T1; and the windings 52 and 50 of the cores C1 and C2 provide a load circuit for the transistor T2. If an input signal of the proper polarity appears (say the positive input signal 84), then the transistor T1 is biased for conduction. The application of an energizing pulse 59 during the presence of the input signal 84 causes the energizing source 58 to send a larger amount of current to the transistor T1 than to the transistor T2. The larger portion of the energizing current flows from the first junction 48 through the reset winding 46 of the core C2 and the setting winding 45 of the core C1, and then through the collector-to-emitter path of the transistor T1 to ground. The smaller portion of the energizing current flows from the first junction 48 through the reset winding 52 of the core C1, the setting winding 50 of the core C2, and the collector-to-emitter path of the transistor T2 to ground. The larger portion of the energizing current produces a correspondingly larger voltage across the setting winding 45 of the core C1 than is produced across the setting winding 50 of the core C2. As a result, the voltage at the collector 38 of the transistor T1 is made lower (more negative) than the voltage at the collector 42 of the transistor T2. Because of the collector-to-base cross-coupling, the transistor T1 is driven still further into conduction, and the transistor T2 is driven towards non-conduction. The regenerative action continues until the transistor T1 is conducting to saturation and the transistor T2 is completely cut-off. The energizing current flowing through the setting winding 45 of the core C1 changes the core C1 from its initial —B*r* remanent state to saturation in the positive direction. The energizing current flowing in the reset winding 46 magnetizes the core C2 from its initial —B*r* remanent state into saturation in the negative direction. When the energizing pulse 59 is terminated, the core C1 returns to its B*r* remanent condition, and the core C2 returns to its —B*r* remanent state.

A similar operation takes place if a negative input signal 86 is received. Thus, assume both cores C1 and C2 are magnetized initially in the —B*r* state. If a negative input signal 86 is applied, the transistor T2 is biased for conduction. Upon application of an energizing pulse 59, the energizing current divides unevenly at the first junction 48. The larger portion of the energizing current now flows through the setting winding 50 of the core C2, the reset winding of the core C1, and through the collector-to-emitter path of the transistor T2 to ground. Accordingly, the voltage at the collector electrode 42 of the transistor T2 becomes more negative and a regenerative action takes place with the transistor T2 being driven to full conduction and the transistor T1 being driven to full cut-off. The current flow in the setting winding 50 changes the core C2 from its —B*r* remanent condition to saturation in its positive direction. The current flow in the reset winding 52 changes the core C1 from its —B*r* remanent saturation in the negative direction. Upon termination of the energizing pulse 59, the core C2 returns to its B*r* remanent state and the core C1 returns to its —B*r* remanent state.

The energizing pulse 59 may be applied concurrently with an input signal 84 or 86 or immediately after an input signal. If it is desired to apply the energizing pulse 59 after an input signal is terminated, then the minority carrier storage property of certain transistors can be used to advantage. The carrier storage property is known to exist to a marked degree in certain relatively low-frequency transistors. By "relatively low-frequency" is meant below frequencies of about one megacycle. Thus, when an input signal of proper polarity is applied to the base electrode of a transistor, minority carriers are injected into the base region of that transistor. These minority carriers remain stored in the transistor base region for a given interval of time after the input signal is terminated. If, now, an energizing pulse 59 is applied during that given time interval, then the one of the pair of transistors that received the minority carriers becomes fully conducting, and the other transistor becomes fully cut-off. The given time interval for minority carrier storage can be extended by increasing the amplitude of the base input signals.

The flux change produced in a core C1 or C2, in changing from its —B*r* to its B*r* remanent state, does not produce any current flow in the current paths 60 and 64 because of the back-to-back connection of the crystal diodes 68 and 71. Also, the drive source 72 is open-circuited during the application of the energizing pulse 59. Accordingly, when either the input signal 84 or the input signal 86 is received, the remanent state of a corresponding one of the cores C1 and C2 is changed. The changed core remains in the set state until the subsequent application of a positive drive pulse 73 from the drive source 72.

One of the output signals 87 and 88, corresponding to one of the two input signals 84 and 86, can be obtained at any desired later time by activating the drive source 72. For example, assume that the core C1 is at its B*r* remanent state corresponding to the storage of a positive input signal 84. When the drive pulse 73 is applied, drive current flows through the control windings 74 and 76 of the cores C1 and C2 to the second junction 62. The drive current flowing in the drive winding 74 of the core C1 produces a magnetizing force changing the core C1 from its B*r* remanent state to saturation in the negative direction. The drive current flowing in the control drive winding 76 of the core C2 produces a magnetizing force which magnetizes the core C2 from its —B*r* remanent state to saturation in the negative direction. The relatively large flux change in the core C1 induces a relatively large voltage across the control winding 66 in a direction to bias the crystal diode 68 of the first current path 60 to cut-off, and in a direction to bias the crystal diode 71 in the second current path 64 to conduction. Accordingly, the drive current flows from the second junction 62 and through the second current path 64. Current flow in the secondary winding 16 of the transformer 12 induces a positive output pulse 87 across the terminals of the primary winding 10 of the transformer 12. The positive pulse 87 may be applied to the external memory 8 as one input signal. After the drive pulse 73 is terminated, the cores C1 and C2 return to their −Br remanent states.

Assume, now, that the core C2 is magnetized in the Br state corresponding to the storage of the negative input signal 86. The drive current from the drive source 72 then produces a voltage across the control winding 70 of the core C2 in a direction to bias the crystal diode 71 in the second current path 64 to cut-off, and in a direction to bias the crystal diode 68 in the first current path 60 to conduction. Accordingly, the drive current flows from the second junction 62 through the first current path 60 to ground. The current flow in the secondary winding 16 of the transformer 12 induces a negative output pulse 88 across the terminals of the primary winding 10. The negative pulse 88 may be applied as a second input signal to the external memory device 8.

In certain magnetic-core memory systems, a memory element may store either a binary "1" or a binary "0" digit. When the element is storing a binary "1" digit, a postive-polarity output may be derived during a reading operation. When the element is storing a binary "0" digit, a negative-polarity output is derived during the reading operation. During the reading process, however, the initial state of the memory element is changed, and if the stored information is to be retained, an additional signal must be applied at a later time to restore the element to its initial state. This later applied signal is termed a "rewrite" signal and is applied during a subsequent writing operation. In the circuit of Fig. 1, for example, the primary winding 10 of the transformer 12 may be used for both reading out of, and writing into, the magnetic-core memory system. If a positive-polarity signal 84 is applied to the primary winding 10 during the reading operation of an external memory, then, during the later operation of writing into this external memory, a positive-polarity signal 87 is induced in the primary winding 10 to change the external memory, magnetic element to its initial state. If, however, a negative-polarity signal 86 is applied to the primary winding 10 from the external memory as a result of the reading operation, then a negative-polarity signal 88 is induced in the primary winding 10 during the later writing operation.

New information may be written into the memory element of the external memory by using a write source 80. The write source 80 has one output connected to the base electrode 30 of the transistor T1 and has another output connected to the base electrode 36 of the transistor T2. If it is desired to write a binary "1" into the external memory element, a positive voltage pulse 90 is applied by the write source 80 to the base electrode 30 of the first transistor T1. Accordingly, the first transistor T1 is conditioned to be relatively highly conducting and the transistor T2 relatively non-conducting. The amplitude of the write "1" signal 90 is preferably larger than any signal induced across the secondary winding 14 of the transformer 12 during the external memory read operation. Therefore, the transistor T1 is conditioned for conduction regardless of any signal induced in the secondary winding 14 during this reading operation. When the energizing pulse 59 is applied, the core C1 is changed to its Br remanent state. A later drive signal 73 then changes the core C1 to its −Br remanent condition. The drive current then flows through the second current path to produce the positive output signal 87. If it is desired to write a binary "0" into the external memory element, a positive voltage pulse 92 is applied by the write source 80 to the base electrode 36 of the transistor T2 to condition the transistor T2 for conduction. An energizing pulse 59 then changes the core C2 to its Br remanent state, and a later drive signal 73 changes the core C2 back to its initial −Br remanent state. The drive current flows through the first current path to produce the negative output signal 88.

Figure 4:
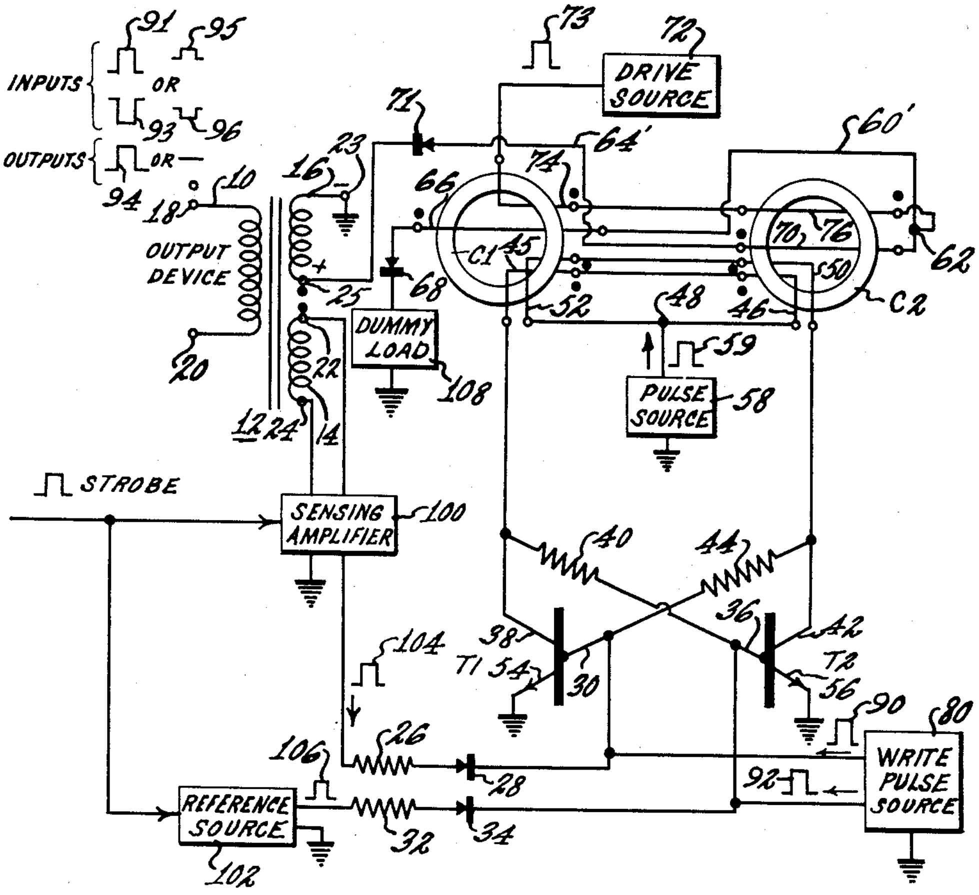
Fig. 4 is a schematic diagram of another embodiment of the invention which provides an output in accordance with the amplitude of an input signal.

Another embodiment of a signal-responsive system, according to the invention, is shown in Fig. 4. The system of Fig. 4 is used for operation in systems where the input signal may be of either a relatively large or of a relatively small amplitude. Both input signals, however, may be of either polarity. When a relatively large input signal 91 or 93 of either positive or negative polarity is received, a relatively large output signal 94 is produced at a later time across the primary winding 10 of the transformer 12. When a relatively small input signal 95 or 96 of either positive or negative polarity is received, no output is produced across the primary winding of the transformer 12 at the later time.

The terminals 22 and 24 of the secondary winding 14 of the transformer 12 are respectively connected to two inputs of a sensing amplifier 100. One of the outputs of the sensing amplifier 100 is connected in series with the current-limiting resistor 26 and the crystal diode 28 to the base electrode 30 of the first transistor T1. A reference source 102 has one output connected in series with the current-limiting resistor 32 and the crystal diode 34 to the base electrode 36 of the transistor T2. Another output of the reference source 102 is connected to ground. The sensing amplifier 100 may be any amplifier which responds to an input signal of given amplitude, and of either polarity, to furnish an output signal 104 of predetermined amplitude and of positive polarity. Suitable sensing amplifier circuits are known in the art; for example, that described in an article by William N. Papian, entitled "The MIT Magnetic-Core Memory," published in the Proceedings of the Eastern Joint Computer Conference of December 8–10, 1954, pp. 37–42. A dummy load 108 is connected between ground and the cathode of diode 71 of a first current path 60'. The center taps of the transformer 12 secondaries 16 and 14 are not used, and the terminal 23 of the secondary winding 16 is connected to ground. The reference source 102 is arranged for supplying positive reference pulses 106 to the base electrode 36 of the transistor T2. Each reference pulse 106 is smaller in amplitude than each sensing amplifier output pulse 104.

In the circuit of Fig. 4, the transistors T1 and T2 operate to compare the respective amplitudes of the simultaneously-applied sensing output signal and the reference signal 106. The sensing amplifier and reference source outputs may be synchronized by any suitable means, for example, a strobe signal. Assume, now, that the sensing amplifier output signal 104 is larger in amplitude than the reference signal 106. Upon the application of the sensing and reference signals 104 and 106, a relatively small base-to-emitter current flows in each of the transistors T1 and T2. The base-to-emitter current flow places some minority charge carriers in the base region of each of the transistors T1 and T2. However, because the amplitude of the sensing signal 104 is larger than the amplitude of the reference signal 106, more minority charge carriers are stored in the base region of the transistor T1 than are stored in the base region of the transistor T2. Upon the application of an energizing pulse 59 from the energizing source 58 before the stored charge carriers dissipate, more current flows in the collector-to-emitter path of the transistor T1 than in the collector-to-emitter path of the transistor T2. The cross-coupling between the transistors T1 and T2 results in a regenerative action with the first transistor T1 being triggered into a relatively high-conducting state, and the transistor T2 being triggered into a relatively non-conducting state. When the transistor T1 is thus triggered, most of the current from the energizing source 58 flows from the first junction 48 and through the setting winding 45 to change the core C1 to its $Br$ remanent condition, as described above in connection with Fig. 1. And, as described above, when a later drive signal 73 is applied, the core C1 is returned to its $-Br$ remanent condition, and the drive current flows from the second junction 62 and through a second current path 64′ which includes the secondary winding 16 of the transformer 12. The current flow in the path 64′ causes a relatively large positive output signal 94 to be induced in the primary winding 10 of the transformer 12.

When a relatively small-amplitude input signal 95 or 96 is applied to the primary winding 10 of the transformer 12, the sensing amplifier 100 does not provide any output signal, as this amplifier has a suitable threshold to prevent its passing small-amplitude signals. However, the larger-amplitude reference signal 106 causes an increase in the minority carriers in the base region of the transistor T2. Upon application of an energizing pulse 59 from the source 58, the transistor T2 then changes to a relatively highly conducting condition and the transistor T1 to a relatively non-conducting condition. The energizing current flows through the setting winding 50 of the core C2 to change the core C2 to its $Br$ remanent state. Upon application of a subsequent drive signal 73, the core C2 is changed back to its $-Br$ state and the drive current flows from the second junction 62 through the first current path 60′ to the dummy load 108. The dummy load 108 is provided in order to increase the efficiency of operation of the drive source 72. Thus, the impedance seen by the drive source 72 is substantially the same whether the drive current flows through the first current path 60′ or the second current path 64′.

The circuit of Fig. 4 may be used in conjunction with an external magnetic core memory. Thus, either one of the large-amplitude input signals 91 or 93 may correspond to a binary "1" digit read from an external memory element during a reading operation, and either one of the small-amplitude signals may correspond to the binary "0" digit read from the external memory element. During the subsequent writing operation, the positive output signal 94 is supplied to the external memory if a binary "1" digit is to be rewritten, and no output signal is supplied if a binary "0" digit is to be rewritten. New information can be inserted into the external memory element by activating the write source 80, as described above in connection with Fig. 1.

Figure 5:
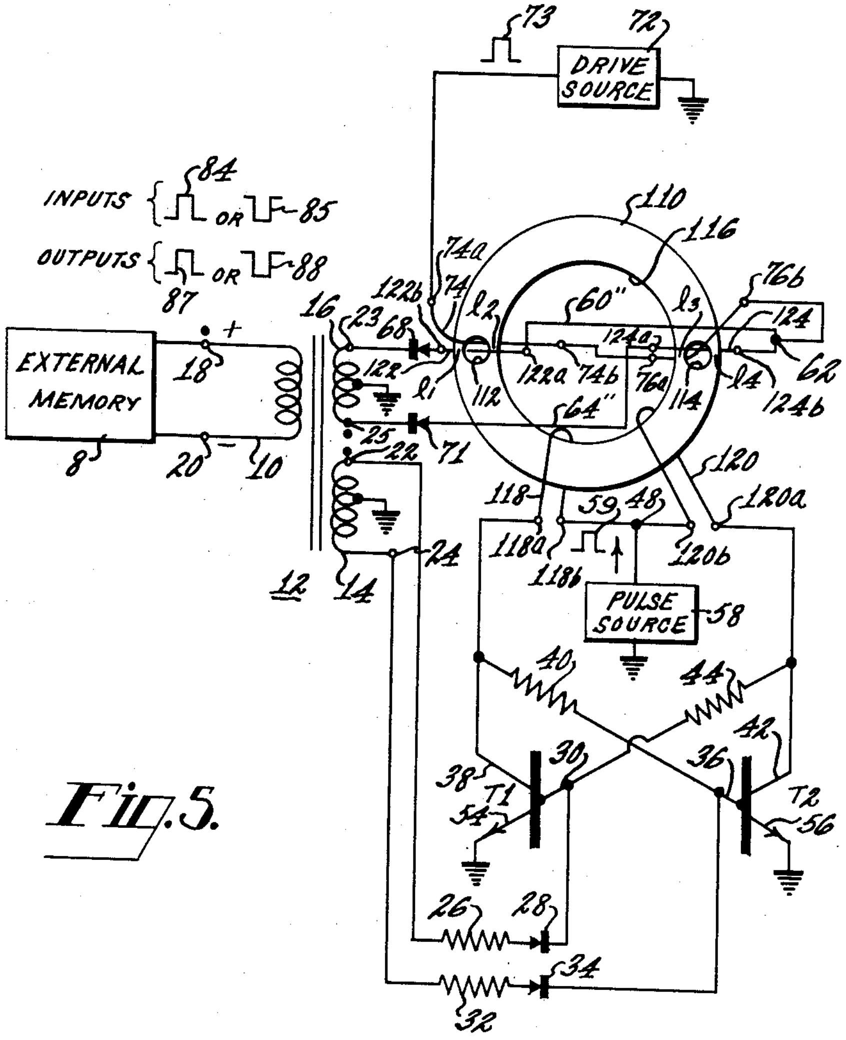
Fig. 5 is a schematic diagram of a third embodiment of the invention using a single multiapertured core in a memory circuit.

Fig. 5 shows an embodiment of the invention using a transfluxor having a three-apertured, transfluxor core 110 in place of the two-core system of Fig. 1. The transfluxor core 110 may be similar to that described in an article by J. A. Rajchman and the present applicant, entitled "The Transfluxor," published in the Proceedings of the IRE, March 1956, pp. 321–332.

Two smaller drive apertures 112 and 114 of the core 110 are located at either side of a larger, central aperture 116 and provide four legs $l_1$, $l_2$, $l_3$ and $l_4$, each of equal cross-sectional area. One terminal 118a of a setting winding 118 is connected to the collector electrode 38 of the first transistor T1. One terminal 120a of another setting winding 120 is connected to the collector electrode 42 of the second transistor T2. Beginning with the terminal 118a, the first setting winding 118 is threaded through the central aperture 116 of the core 110 from the top down, as viewed in Fig. 5, and terminates at another terminal 118b connected to the first junction 48. Beginning with the terminal 120a, the second setting winding 120 is threaded through the central aperture 116 of the core 110 from the bottom up, as viewed in Fig. 5, and terminates at another terminal 120b connected to the first junction 48. A first current path 60″ includes a first control winding 122 which is linked to the core 110 through the first drive aperture 112. A second current path 64″ includes a second control winding 124 which is linked to the transfluxor core 110 through the second drive aperture 114. The control windings 122 and 124, beginning at their respective terminals 122a and 124a, are each threaded downwardly through the respective first and second drive apertures 112 and 114. The terminals 122a and 124b of the first and second control windings 122 and 124 are connected to the second junction 62. The first control winding 122, the crystal diode 68, and the upper portion of the secondary winding 16 of the transformer 12 are connected in series between the second junction 62 and ground. The second control winding 124, the crystal diode 71, and the lower portion of the secondary winding 16 of the transformer 12 are connected between the second junction 62 and ground. The first drive winding 74, beginning at one terminal 74a, is threaded downwardly through the first setting aperture 112, and then across the bottom surface of the core 110 of the terminal 74b. The second drive winding 76, beginning at one terminal 76a, is threaded upwardly through the second setting aperture 114, and then across the top surface of the core 110 to the terminal 76b. The first and second drive windings 74 and 76 are connected to each other at their terminals 74b and 76a. The terminal 74a of the first drive winding 74 is connected to an output of the drive source 72 and the terminal 76b of the second drive winding 76 is connected to the second junction 62.

In operation, when a positive input signal 84 is applied to the primary winding 10 of the transformer 12, and when the energizing pulse 59 is applied by the energizing source 58, the first transistor T1 is rendered highly conductive. The energizing current flows from the first junction 48 and upwardly through the central aperture 116 in a direction to produce a counterclockwise flux flow around the central aperture 116, in each of the legs $l_1$, $l_2$, $l_3$ and $l_4$ of the core 110. When a later drive pulse 73 is applied by the drive source 72, the drive current flows downwardly through the first drive aperture 112 and upwardly through the second drive aperture 114. No flux change is produced in the legs $l_2$ and $l_4$ by the drive current because these legs already are saturated with flux in the counterclockwise sense. However, the drive current flow through the first drive aperture 112 is of sufficient amplitude and is in a direction to produce a flux change in the legs $l_1$ and $l_3$ from the counterclockwise to the clockwise sense. The voltage induced in the second control winding 122 is in a direction to render the crystal diode 68 in the first current path 60″ non-conducting. Accordingly, the drive current flows from the drive source 72, through the second current path 64″ to produce the positive output signal 87.

When the negative input signal 85 is applied, the energizing pulse 59 causes the transistor T2 to be relatively highly conducting, and the transistor T1 to be relatively non-conducting. Accordingly, the current from the energizing source 58 flows downwardly through the central aperture 116 of the core 110 in a direction to produce a flux in the clockwise sense in each of the legs $l_1$, $l_2$, $l_3$ and $l_4$. Now, when the drive source 72 is activated, the drive current produces a flux change from the clockwise to the counterclockwise sense in the legs $l_4$ and $l_2$. No flux change is produced in the legs $l_1$ and $l_3$ because these legs already are saturated with flux in the clockwise sense. The flux change in the legs $l_4$ and $l_2$ produce a voltage across the second control winding 124 of the current path in a direction to make the crystal diode 71 non-conductive. Accordingly, the drive current from the source 73 flows from the second junction 62 through the first current path 60″ to produce the negative output signal 88.

The system of Fig. 5 may be modified if it is desired to operate with memory or other systems which provide either relatively high or relatively low input signals. The modification is carried out in the same manner as the circuit of Fig. 1 is modified, to produce the circuit of Fig. 4.

There have been described herein improved signal-responsive circuits which include a triggerable flip-flop circuit having different dynamic response conditions for controllng the response conditions of a coupled magnetic memory circuit. The same energizing pulse is used for activating the flip-flop circuit to one of its dynamic response conditions and for changing the magnetic memory circuit to a different response condition. No holding power is required for either circuit. The input signals which control the response conditions of the flip-flop circuit may be of different polarities or of different amplitudes, as described in Figs. 1 and 4 herein. Separate magnetic cores or a single multi-apertured magnetic core may be used for the magnetic memory circuit of the signal-responsive systems as described, for example, in Figs. 1 and 5 herein.

Certain of the known magnetic core memory systems are arranged in a so-called word organized fashion; that is, a separate magnetic core array is provided for each binary digit of a word. A word is read out of the arrays by simultaneously selecting the cores located in corresponding positions in each of the arrays. The signal-responsive circuits of the present invention may be used with such word-organized memory systems by providing a separate signal-responsive circuit for each separate memory array. A common energizing pulse source, however, may be used for all the separate signal-responsive circuits.

What is claimed is:

1. A signal-responsive circuit comprising an electronic circuit having a pair of inputs and a pair of output current paths and having different dynamic response conditions controlled by different input signals received at said inputs and triggerable to said dynamic response conditions by an energizing signal applied to said current paths, a magnetic memory circuit coupled to said electronic circuit current path, said memory circuit having an initial condition and having different static response conditions controlled by said electronic circuit, and said memory circuit being established in said different static response conditions by said energizing signal, a pair of output signal paths coupled to said magnetic memory circuit, means for restoring said memory circuit to its said initial condition, means for applying a drive signal to both said signal paths while said memory circuit is being restored to said initial condition, said drive signal being directed in either one or the other of said signal paths in accordance with the response condition of said memory circuit.

2. A signal-responsive circuit comprising an electronic bistable circuit having a pair of inputs and a pair of output current paths, a magnetic memory circuit having two response conditions coupled to said bistable circuit current paths, said bistable and said memory circuits assuming corresponding ones of said response conditions upon the application of the same energizing signal to both said circuits, means for applying different input signals to said bistable circuit inputs to enable it to assume different ones of said response conditions, said memory circuit having a pair of output paths connected in parallel with each other, and means for applying a drive signal to both said output paths in parallel, said drive signal being directed in the one or the other of said paths in accordance with the response condition of said memory circuit.

3. A signal-responsive circuit comprising an electronic circuit having a pair of inputs and a pair of output current paths having different dynamic response conditions controlled by different input signals applied to said pair of inputs and triggerable to said dynamic response conditions by an energizing signal applied to said pair of current paths, a magnetic memory circuit coupled to said electronic circuit current paths, said memory circuit having an initial condition and having different static response conditions controlled by said electronic circuit, and said memory circuit being established in said different static response conditions by said energizing signal, a pair of output signal paths coupled to said magnetic memory circuit, means for applying said different input signals to said electronic circuit, means for applying said energizing signal to said electronic and said memory circuits, means for applying a restore signal to said memory circuit to return it to its said initial condition, and means for applying to both said signal paths a drive signal concurrently with said restore signal, said drive signal being directed in either one or the other of said signal paths in accordance with the response condition of said memory circuit.

4. A signal-responsive circuit as claimed in claim 3, said magnetic memory circuit including first and second cores of substantially rectangular hysteresis loop magnetic material, said cores each having windings linked thereto, one winding on each said core being connected to said electronic circuit, said pair of output paths being coupled respectively to said magnetic cores and said energizing signal being applied to both said one windings.

5. A signal-responsive circuit comprising a dynamic bistable circuit having two energization paths connected in parallel with each other, and having two signal inputs for respectively controlling said energization paths, a static magnetic memory circuit having different response conditions, said memory circuit including said two energization paths, and having two output paths respectively controlled by said energization paths, said memory circuit including magnetic material of rectangular hysteresis loop characteristics, said output and said energization paths each being linked to said material, means for applying an energizing signal to said energization paths, said energizing signal flowing in different ones of said energization paths under the control of signals applied to said signal inputs, said energizing signal changing said magnetic memory circuit from an initial condition to one of said response conditions, means for applying a magnetizing force to said memory circuit to return said memory circuit to said initial condition, and means for applying concurrently a drive signal to both said output paths, said drive signal flowing in the one or the other of said output paths under the control of said different response conditions.

6. A signal-responsive circuit as claimed in claim 5, said memory circuit including first and second cores of substantially rectangular hysteresis loop magnetic material and windings linked to said cores, one winding on each of said cores being connected in series in a different one of said energization paths, said output paths each being linked to a different one of said cores, and said output paths being connected in parallel with each other.

7. A signal-responsive circuit as claimed in claim 5, said bistable circuit including a pair of transistors, and said memory circuit including a pair of magnetic cores of substantially rectangular hysteresis loop magnetic material, a first winding on each of said cores coupled to a different one of said transistors, said output paths each being linked to a different one of said cores, and said output paths being connected in parallel with each other.

8. A signal-responsive circuit as claimed in claim 5, said two signal inputs being of opposite polarity, one of said signal inputs controlling one of said energization paths, and the other of said input signals controlling the other of said energization paths.

9. A signal-responsive circuit as claimed in claim 5, wherein said two control signal inputs include a first signal to be compared with a second signal, said signals being applied concurrently, one of said energization paths being controlled when first signal is larger in amplitude than said second signal, and the other of said energization paths being controlled when said second signal is larger in amplitude than said first signal.

10. A signal-responsive circuit comprising a triggerable bistable circuit having two response conditions corresponding to two input signals, said bistable circuit including a pair of transistors each enabled by different ones of said input signals, a magnetic memory circuit having two response conditions for furnishing two output signals on two output paths, said magnetic memory circuit including magnetic material of substantially rectangular hysteresis loop characteristics having windings linked to said material, said windings each being connected as a load impedance for a different one of said transistors, said output paths being linked to said magnetic material, and said output paths being connected in parallel with each other, means including said windings for supplying an energizing pulse for activating the enabled one of said transistors, said energizing pulse flowing in that one of said windings connected to said enabled transistor to produce a flux change in one sense in the magnetic material of said memory circuit, means for applying a magnetizing force to said magnetic material in a direction to produce therein a flux change in the sense opposite the one sense, and means for applying a drive signal to both said output paths concurrently with said magnetizing force, said drive signal flowing in either one or the other of said output paths under the control of voltages induced in said output paths by the flux change produced in said material by said magnetizing force.

11. A signal-responsive circuit for producing two different output signals in accordance with two different input signals comprising first and second transistors each having collector, emitter, and base electrodes and an emitter-to-collector path, said collector and base electrodes being cross-coupled, first and second magnetic cores each having two remanent states, and each being magnetized in an initial one of said states, separate windings on said cores, first and second series circuits each including one of said separate windings and the said collector-to-emitter path of one of said transistors, first and second current paths respectively linking said first and second cores, means for applying said input signals to the base electrodes of said first and second transistors respectively, means for applying an energizing pulse to said series circuits, said energizing pulse being directed in one of said series circuits under the control of said input signals to change one of said cores from said initial to the other of said remanent states, means for applying magnetizing forces to both said cores in a direction to return each to its initial remanent state, and means for concurrently applying a drive signal to both said current paths, said drive signal being directed in the current path linked to the other of said cores.

12. A signal-responsive circuit comprising a pair of transistors each having collector, emitter, and base electrodes, and a collector-to-emitter path, said collector and base electrodes being cross-coupled, a pair of magnetic cores each having two remanent states and each being magnetized in an initial one of said states, each of said cores having windings linked thereto, a common junction, a series circuit connecting in series one winding on a first of said cores and the said first transistor collector-to-emitter path, a second series circuit connecting in series one winding on the second of said cores and said second transistor collector-to-emitter path, said series circuits being connected in parallel with each other at said common junction, first and second current paths connected in parallel with each other, and each linked to a different one of said cores, means for applying input signals to said base electrodes of said transistors, means for applying an energizing signal to said common junction, said energizing signal current flowing in the one or the other of said series circuits in accordance with said input signals, said energizing signal current changing one of said cores from an initial to the other of its remanent states, means for applying magnetizing forces to said cores in a direction to change each from its other to said initial remanent state, and means for applying a drive signal to said current paths concurrently with said magnetizing forces, said drive signal being steered through one or the other of said current paths in accordance with flux changes produced in said cores when said changed core is returned to its initial remanent state.

13. A signal-responsive circuit comprising a pair of transistors each having collector, emitter, and base electrodes, and a collector-to-emitter path, said collector and base electrodes being cross-coupled, a pair of magnetic cores each having two remanent states and each being magnetized in an initial one of said states, each of said cores having setting, reset, control and drive windings linked thereto, a first junction, a series circuit connecting in series said first core setting winding, said second core reset winding, and said first transistor collector-to-emitter path, a second series circuit connecting in series said second core setting winding, said first core reset winding, and said second transistor collector-to-emitter path, said series circuit being connected in parallel with each other at said first junction, a second junction, first and second current paths connected in parallel with each other at said second junction, said first current path including said first core control winding and a unidirectional conducting device, and said second current path including said second core control winding and a unidirectional conducting device, a drive circuit connected to said second junction, said drive circuit including said first and second core drive windings in series with each other, means for applying input signals to said base electrodes of said transistors, means for applying an energizing signal to said first junction, said energizing signal current flowing in the one or the other of said series circuits in accordance with said input signals to drive one of said cores from an initial to the other of said remanent states, means for applying a drive current to said drive circuit for changing said one core from said other to said initial remanent state, said drive current thereby flowing in the current path linked to the other of said cores.

14. A signal-responsive circuit comprising an electronic circuit having different dynamic response conditions controlled by different input signals and triggerable to said dynamic response conditions by an energizing signal, a magnetic memory circuit including a core of substantially rectangular hysteresis loop magnetic material having apertures, a first and a second winding being linked to said core through a first aperture thereof, said first and second windings being coupled to said electronic circuit, said memory circuit having an initial condition and having different static response conditions controlled by said electronic circuit, and said memory circuit being established in said different response conditions by said energizing signal, a pair of output signal paths coupled to said magnetic memory circuit, one of said signal paths being coupled through a second of said core apertures and another of said signal paths being coupled through a third of said core apertures, said pair of signal paths being connected in parallel with each other, means for applying said different input signals to said electronic circuit, means for applying said energizing signal to said electronic and said memory circuits, means for applying a restore signal to said memory circuit to return it to said initial condition, said restore signal being applied to said magnetic circuit through said second and third apertures of said core, and means for applying to both said signal paths a drive signal concurrently with said restore signal, said drive signal being directed in either one or the other of said signal paths in accordance with the response condition of said memory circuit.

15. A signal-responsive circuit comprising a dynamic bistable circuit having two energization paths connected in parallel with each other, and having two signal inputs for respectively controlling said energization paths, a magnetic memory circuit having different response conditions, said memory circuit including a core of substantially rectangular hysteresis loop material having apertures therein, a first and a second winding each linked through one aperture of said core and connected in series in a different one of said energization paths, two output paths respectively controlled by said energization paths, said output paths each linking a different one of two other apertures of said core, said output paths being connected in parallel with each other, means for applying an energizing signal to said energization paths, said energizing signal flowing in different ones of said energization paths under the control of signals applied to said signal inputs, said energizing signal changing said memory circuit from an initial condition to one of said response conditions, means for applying a magnetizing force to said memory circuit to return said memory circuit to said initial condition, and means for applying concurrently to both said output paths a drive signal, said drive signal flowing in the one or the other of said output paths under the control of said different response conditions.

References Cited in the file of this patent

UNITED STATES PATENTS

| | | |
|---|---|---|
| 2,772,370 | Bruce | Nov. 27, 1956 |
| 2,798,169 | Eckert | July 2, 1957 |
| 2,805,020 | Lanning | Sept. 3, 1957 |
| 2,854,656 | Bartik | Sept. 30, 1958 |